United States Patent
Gunasekara et al.

(10) Patent No.: US 8,155,658 B1
(45) Date of Patent: Apr. 10, 2012

(54) METHODS AND SYSTEMS FOR PROVIDING DYNAMIC BANDWIDTH ADAPTATION IN WIRELESS SYSTEMS

(75) Inventors: Don Gunasekara, Reston, VA (US); Sunil Prasad, Ashburn, VA (US)

(73) Assignee: Clearwire IP Holdings LLC, Bellevue, MI (US)

( * ) Notice: Subject to any disclaimer, the term of this patent is extended or adjusted under 35 U.S.C. 154(b) by 721 days.

(21) Appl. No.: 12/254,899

(22) Filed: Oct. 21, 2008

(51) Int. Cl.
*H04W 72/00* (2009.01)

(52) U.S. Cl. .............. 455/452.2; 455/450; 455/509; 455/438; 455/434; 455/67.11; 370/208; 370/335; 370/328; 370/465; 370/468

(58) Field of Classification Search ........ 455/452.2, 455/115.3, 438, 450, 434, 509, 67.11; 370/335, 370/208, 328, 465, 468, 344
See application file for complete search history.

(56) References Cited

U.S. PATENT DOCUMENTS

| | | | |
|---|---|---|---|
| 7,133,395 B2 | 11/2006 | Simonsen et al. | |
| 2004/0240390 A1 | 12/2004 | Seckin | |
| 2006/0252389 A1* | 11/2006 | Yellin et al. | 455/115.3 |
| 2009/0191877 A1* | 7/2009 | Jang et al. | 455/438 |

* cited by examiner

*Primary Examiner* — Charles Appiah
*Assistant Examiner* — Michael Vu
(74) *Attorney, Agent, or Firm* — O'Brien Jones PLLC

(57) ABSTRACT

A method is provided for altering a channel bandwidth in a wireless system, wherein the method comprises sending to a wireless device a report request message comprising an indicator of an ability to change the channel bandwidth from a first channel bandwidth to a second channel bandwidth, receiving at an access node a report response message from the wireless device, wherein the report response message comprises a channel condition for the wireless device, and changing the channel bandwidth from the first channel bandwidth to the second channel bandwidth based upon the channel condition.

12 Claims, 9 Drawing Sheets

METHODS AND SYSTEMS FOR PROVIDING DYNAMIC BANDWIDTH ADAPTATION IN WIRELESS SYSTEMS

TECHNICAL BACKGROUND

Efforts continue to develop and deploy the technology to deliver data—voice, audio, etc. —at ever higher rates to customers. To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

One of many goals of these wireless technologies is to solve the so-called "last mile problem." The "last mile" refers to the final connection of delivering service from a service provider to a customer. This is an expensive task for service providers since it usually involves rewiring established residences and businesses with higher capacity connections—typically optical fiber. In other words, while it is usually relatively inexpensive to provide a high speed, high capacity trunk line to any particular community, providing connections from each residence and business to the trunk line can be quite an expensive task, at least in already developed areas.

Many of these wireless technologies take advantage of a communications technology known as orthogonal frequency division multiplexing (OFDM). OFDM communication signals increase the bandwidth and data capacity by spacing subchannels (or subcarriers) very close to each other and still avoid interference because the subchannels are orthogonal to each other. Using this scheme, some wireless technologies can theoretically transmit up to 30 miles requiring line of sight (LOS). However, cell sizes have a small radius of around 5 miles or less for providing high data rate and uniform coverage throughout the cell.

Wireless communications systems, including WiMAX, are designed to provide wireless communications services at a particular channel bandwidth based upon system performance and area of coverage. Wireless system performance in urban areas in particular is likely to be influenced by a variety of factors including but not limited to new construction and changing received signal strengths by wireless devices. When the channel condition is poor, that is, when the signal received by a wireless device is weak, then error rates in the received transmission are likely to increase, thereby requiring the data in the signal to be retransmitted. The result is that when the signal is poor and the system configuration remains the same, it is probable that the overall performance of system will be poor.

Overview

There is disclosed herein a method for altering a channel bandwidth in a wireless system, wherein the method comprises sending to a wireless device a report request message comprising an indicator of an ability to change the channel bandwidth from a first channel bandwidth to a second channel bandwidth, receiving a report response message from the wireless device at an access node, wherein the report response message comprises a channel condition for the wireless device, and changing the channel bandwidth from the first channel bandwidth to the second channel bandwidth based upon the channel condition.

There is further disclosed herein a method for altering a channel bandwidth in a wireless system, wherein the method comprises receiving at a wireless device a report request message from an access node wherein the report request message requests an indicator of an ability of the wireless device to change the channel bandwidth from a first channel bandwidth to a second channel bandwidth, sending a report response message from the wireless device to the access node, wherein the report response message comprises a channel condition for the wireless device and the indicator of the ability of the wireless device to change the channel bandwidth from the first channel bandwidth to the second channel bandwidth, and changing the channel bandwidth from the first channel bandwidth to the second channel bandwidth based upon the channel condition.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
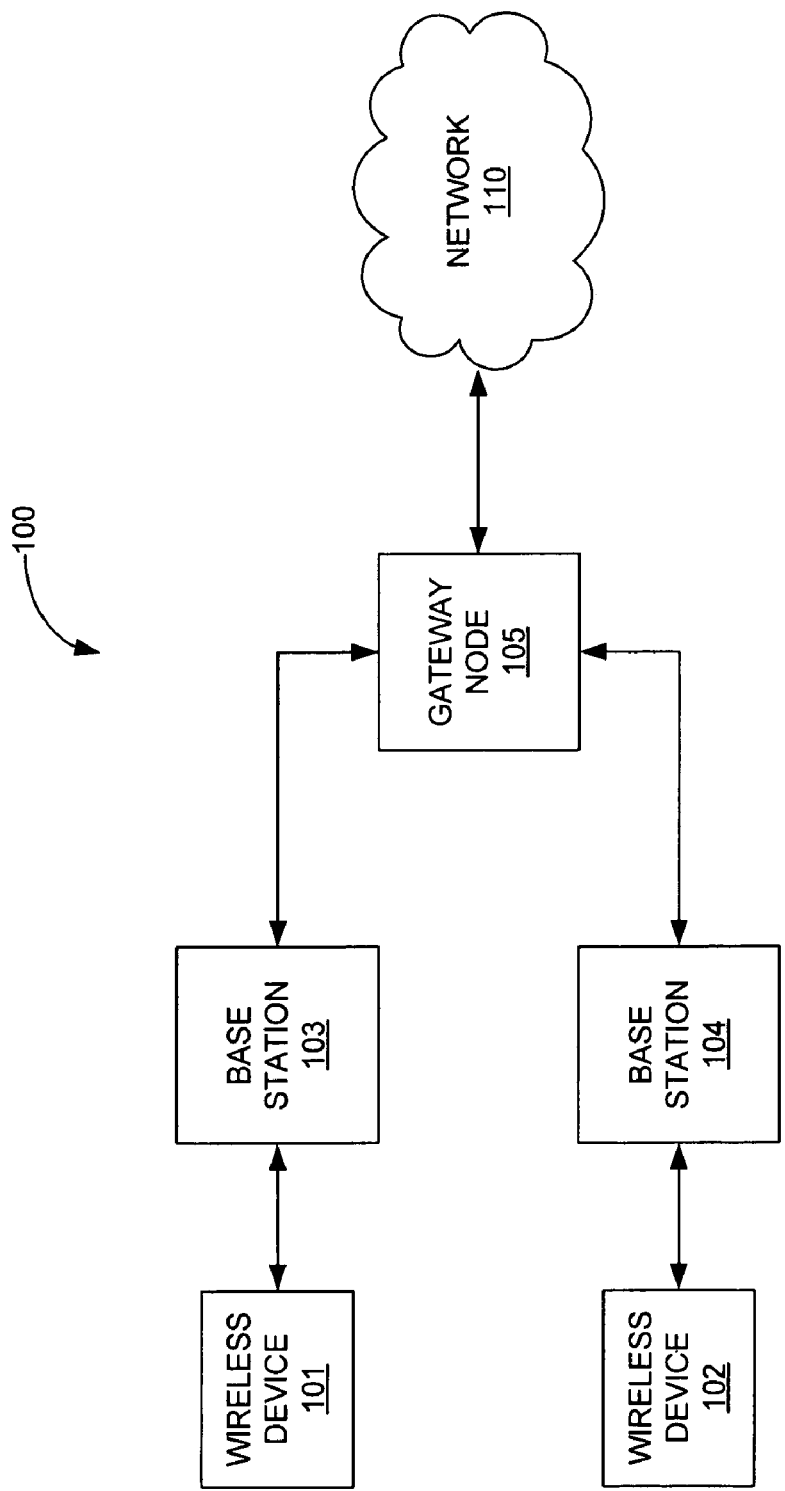
FIG. 1 is a block diagram illustrating a communication environment in which the embodiments disclosed herein may be used.

FIG. 1 illustrates a block diagram of communication environment 100 in which the various exemplary embodiments and their equivalents of the present invention can be employed. As shown in FIG. 1, such an environment 100 includes wireless devices 101 and 102, base stations 103 and 104, gateway node 105, and communication network 110. Gateway node 105 is in communication with communication network 110. Each base station 104 communicates with gateway node 105. Wireless devices 101 and 102 connect wirelessly to base stations 103 and 104.

Wireless devices 101 and 102 may be any device that has wireless communication connectivity. Wireless devices 101 and 102 comprise hardware and circuitry programmed to function as a telecommunications device. For example, wireless devices 101 and 102 could comprise telephones, smartphones, mobile phones, cellular phones, personal digital assistants (PDAs), personal communicators, handheld game consoles, personal computers (PCs), Ultra-Mobile personal computers (UMPCs), handheld televisions, and any other consumer appliance with wireless communication capabilities. Wireless device 101 or 102 may be distributed among multiple devices that together comprise element 101 or 102.

It should be understood that an environment such as communication environment 100 may include more than two wireless devices 101 and 102 and more than two base stations 103 and 104. For the purposes of clarity only, only a limited number of each such item has been shown herein.

Base stations 103 and 104 may be any wireless system that provides an air interface to wireless devices 101 and 102 and communication connectivity to the communication network 110. Examples of base stations that may be utilized include base transceiver stations (BTSs), base station controllers (BSCs), base stations (BSs), radio base stations (RBSs), Node B, enhanced Node B (eNB), and others. Base stations 103 and 104 may also be part of an access node, such as an access service network (ASN). Base stations 103 and 104 may include a number of elements known to those skilled in the art comprising a transceiver, power amplifier, combiner, duplexer, antenna, and control function. Further, base stations 103 and 104 may comprise one antenna or multiple antennas having corresponding sectors and frequency assignments. Base stations 103 and 104 may have several transceivers and corresponding antennas which allow it to serve several different frequencies and different sectors of the base station.

Gateway node 105 provides communication connectivity and acts as an aggregator of traffic or interworking device between one or more base stations 103-104 or base station controllers (not shown) and network 110. Examples of gateway node 105 may include an access service network gateway (ASN-GW), wireless local access network access gateway (WAG), packet data gateway (PDG), mobile switching center (MSC), packet data serving node (PDSN), or any other system or equipment participating in the communication between base stations 103-104 and communication network 110.

Communication network 110 may comprise any wireless network that provides communication connectivity for wireless devices 101 and 102 to send and receive data. Wireless network protocols that may be utilized by communication network 110 may include code division multiple access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), or any other network protocol that facilitates communication between wireless devices 101-102 and communication network 110.

It will be understood that the foregoing communication environment 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner and location.

Figure 2:
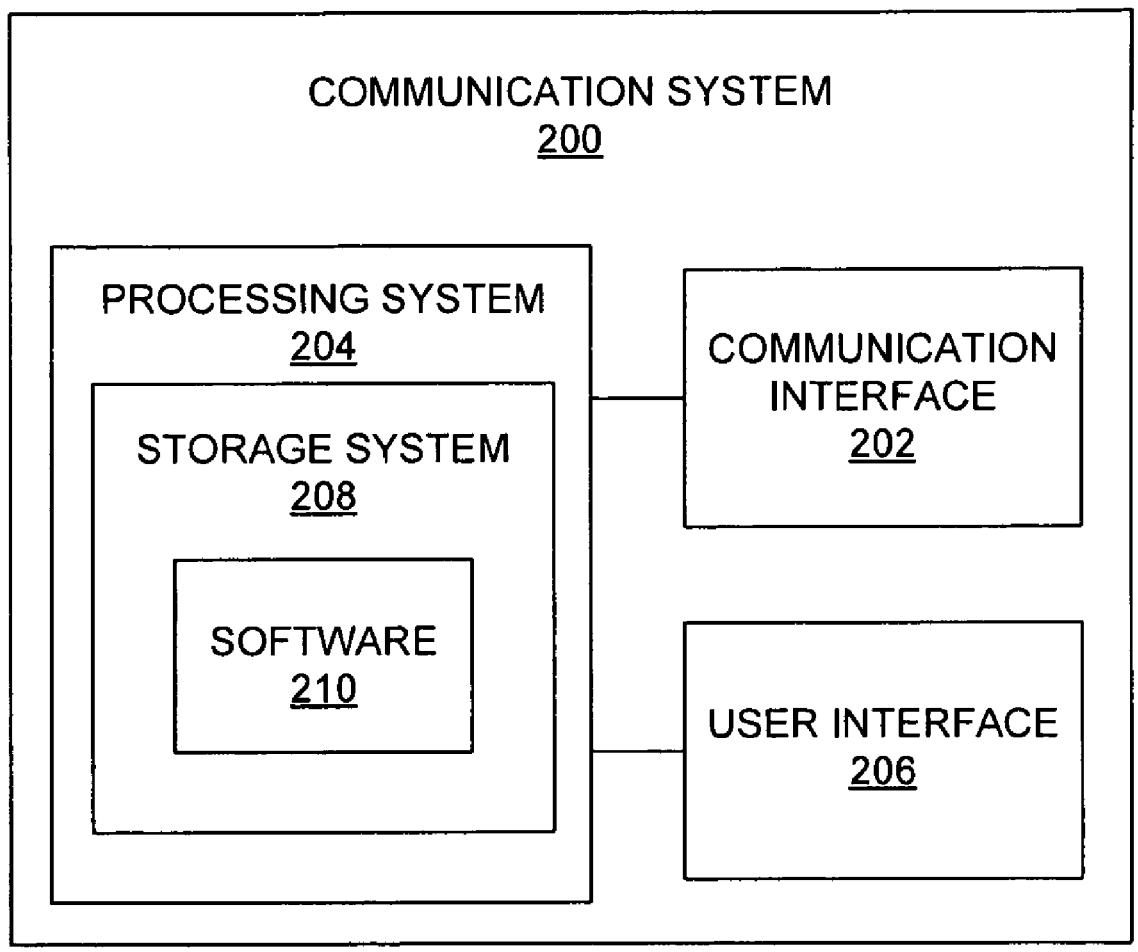
FIG. 2 is a schematic diagram illustrating a communication system in which the present embodiments may find use.

FIG. 2 illustrates a communication system 200 in which the embodiments disclosed herein may find application. System 200 includes communication interface 202, processing system 204, and user interface 206. Processing system 204 includes storage system 208. Storage system 208 stores software 210. Processing system 204 is linked to communication interface 202 and user interface 206. Communications system 200 could be comprised of a programmed general-purpose computer, although those skilled in the art will appreciate that programmable or special purpose circuitry and equipment may be used. Communications system 200 may be distributed among multiple devices that together comprise elements 202-210.

Communication interface 202 could comprise a network interface, modem, port, transceiver, or some other communication device. Communication interface 202 may be distributed among multiple communication devices. Processing system 204 could comprise a computer microprocessor, logic circuit, or some other processing device. Processing system 204 may be distributed among multiple processing devices. User interface 206 could comprise a keyboard, mouse, voice recognition interface, microphone and speakers, graphical display, touch screen, or some other type of user device. User interface 206 may be distributed among multiple user devices. Storage system 208 could comprise a disk, tape, integrated circuit, server, or some other memory device. Storage system 208 may be distributed among multiple memory devices.

Processing system 204 retrieves and executes software 210 from storage system 208. Software 210 may comprise an operating system, utilities, drivers, networking software, and other software typically loaded onto a computer system. Software 210 could comprise an application program, firmware, or some other form of machine-readable processing instructions. When executed by processing system 204, software 210 directs processing system 204 to operate as described herein.

Figure 3:
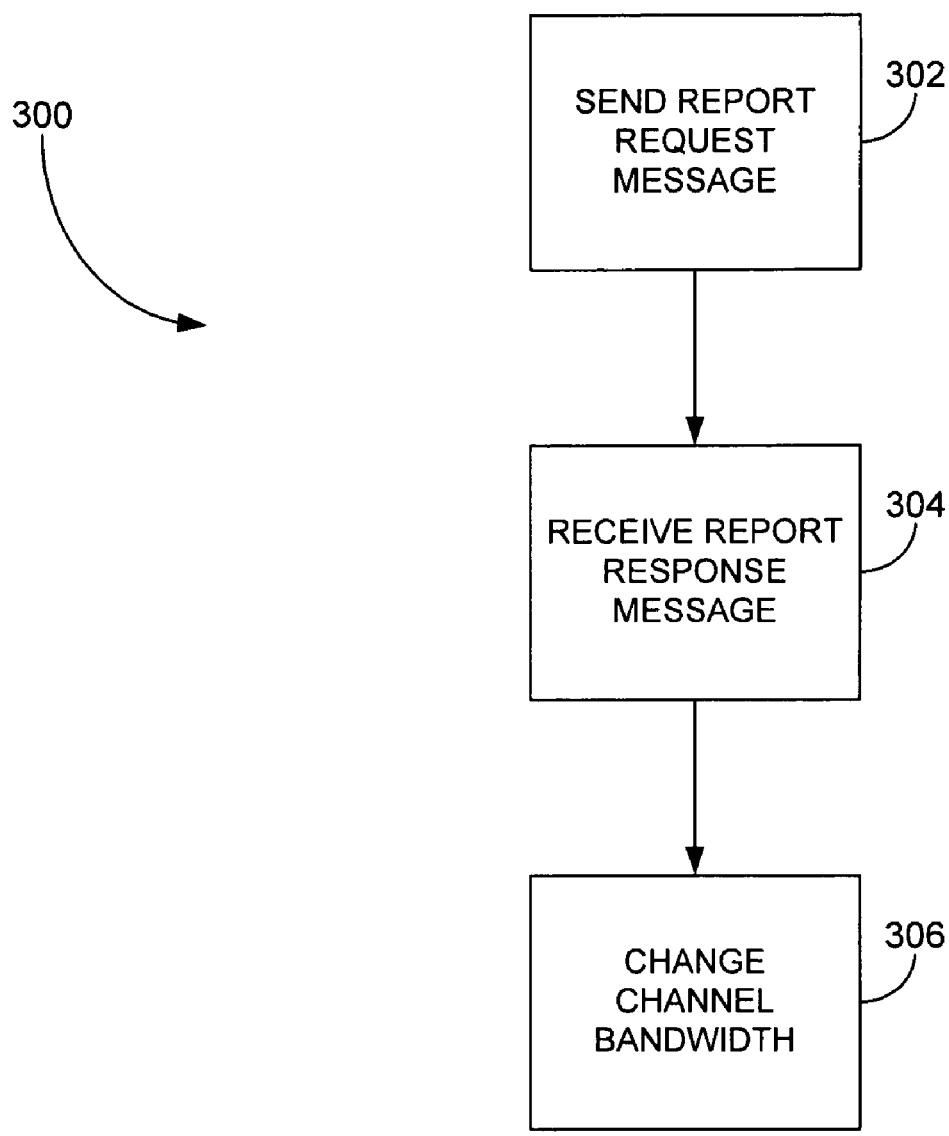
FIG. 3 represents an embodiment of a method for altering the channel bandwidth in a wireless communication system.

FIG. 3 illustrates an embodiment of a method 300 for altering a channel bandwidth in a wireless system. Method 300 comprises sending a report request message from an access node to a wireless device at step 302. The access node comprises a base station, such as base stations 103 and 104. Amongst other information such a report request message may comprise a request that the wireless device return to the access node an indicator of the ability of the wireless device to change the channel bandwidth from a first channel bandwidth to at least a second channel bandwidth depending upon the conditions of the channel.

Upon receiving the report request message, the wireless device will reply and a report response message will be transmitted from the wireless device and received at an access node at step 304. This report response message will include, amongst any other desired information, a channel condition for the wireless device.

Depending upon the indicated channel condition, the channel bandwidth will be changed from the first channel bandwidth to the second channel bandwidth based upon the channel condition at step 306. The channel condition indicator may comprise a carrier interference to noise ratio, for example. Alternatively, the channel condition indicator may comprise a received signal strength indicator. Yet still alternatively, both the carrier interference to noise ratio and the received signal strength indicator may be used to determine whether there is a change in channel condition for the wireless device.

Communication service providers utilizing the method described above, as well as the methods described hereinafter, will establish certain thresholds for determining whether the channel condition has changed sufficiently such that a change in channel bandwidth should be initiated to improve system performance.

Stated less technically, the method described herein provides for the interchange of information between a wireless device and a communication network for determining whether to adjust the channel bandwidth based upon channel conditions. For example, as channel conditions improve, such as when there is an improvement in a carrier interference to noise ratio, the channel bandwidth may be increased. In another example, when the carrier interference to noise ratio decreases, the channel bandwidth may be decreased.

In this embodiment, as well as the other embodiments described hereafter, the channel bandwidth may comprise one or more subcarriers.

Figure 4:
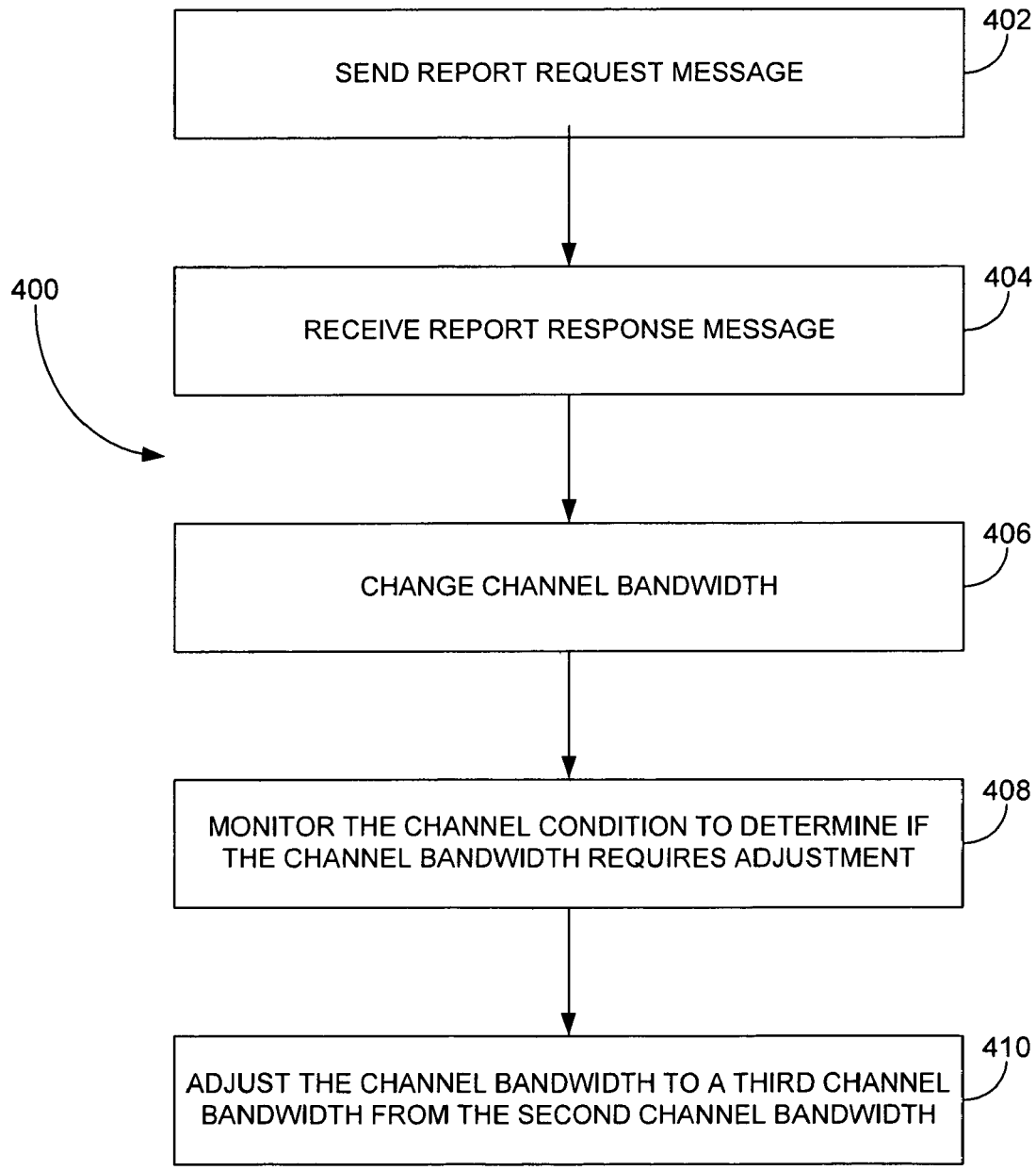
FIG. 4 illustrates another embodiment for altering the channel bandwidth in a wireless communication system.

FIG. 4 illustrates another embodiment 400 of the present invention. At step 402, a report request message is sent from an access node to a wireless device. Amongst other information such a report request message may comprise a request that the wireless device return to the access node an indicator of an ability of the wireless device to change the channel bandwidth from a first channel bandwidth to at least a second channel bandwidth depending upon the conditions of the channel.

Upon receiving the report request message, the wireless device will reply and a report response message will be transmitted from the wireless device and received at an access node at step 404. This report response message will include, amongst any other desired information, a channel condition for the wireless device.

Depending upon the indicated channel condition, the channel bandwidth will be changed from the first channel bandwidth to the second channel bandwidth based upon the channel condition at step 406. The channel condition indicator may comprise a carrier interference to noise ratio, for example. Alternatively, the channel condition indicator may comprise a received signal strength indicator. Yet still alternatively, both the carrier interference to noise ratio and the received signal strength indicator may be used to determine whether there is a change in channel condition for the wireless device.

At step 408 the method 400 contemplates periodic or continuous monitoring of channel conditions to determine if there is a further need to adjust the channel bandwidth. If the monitoring of the channel conditions indicates that the channel condition has changed, then at step 410 the channel bandwidth can be adjusted to a third channel bandwidth appropriate for transmission to the wireless device and to increase or maintain overall wireless system performance. For example, the third channel bandwidth may be increased under improved channel conditions, or may be decreased under deteriorated channel conditions. Under certain changes in channel conditions, the third channel bandwidth may be the same as the first channel bandwidth.

Figure 5:
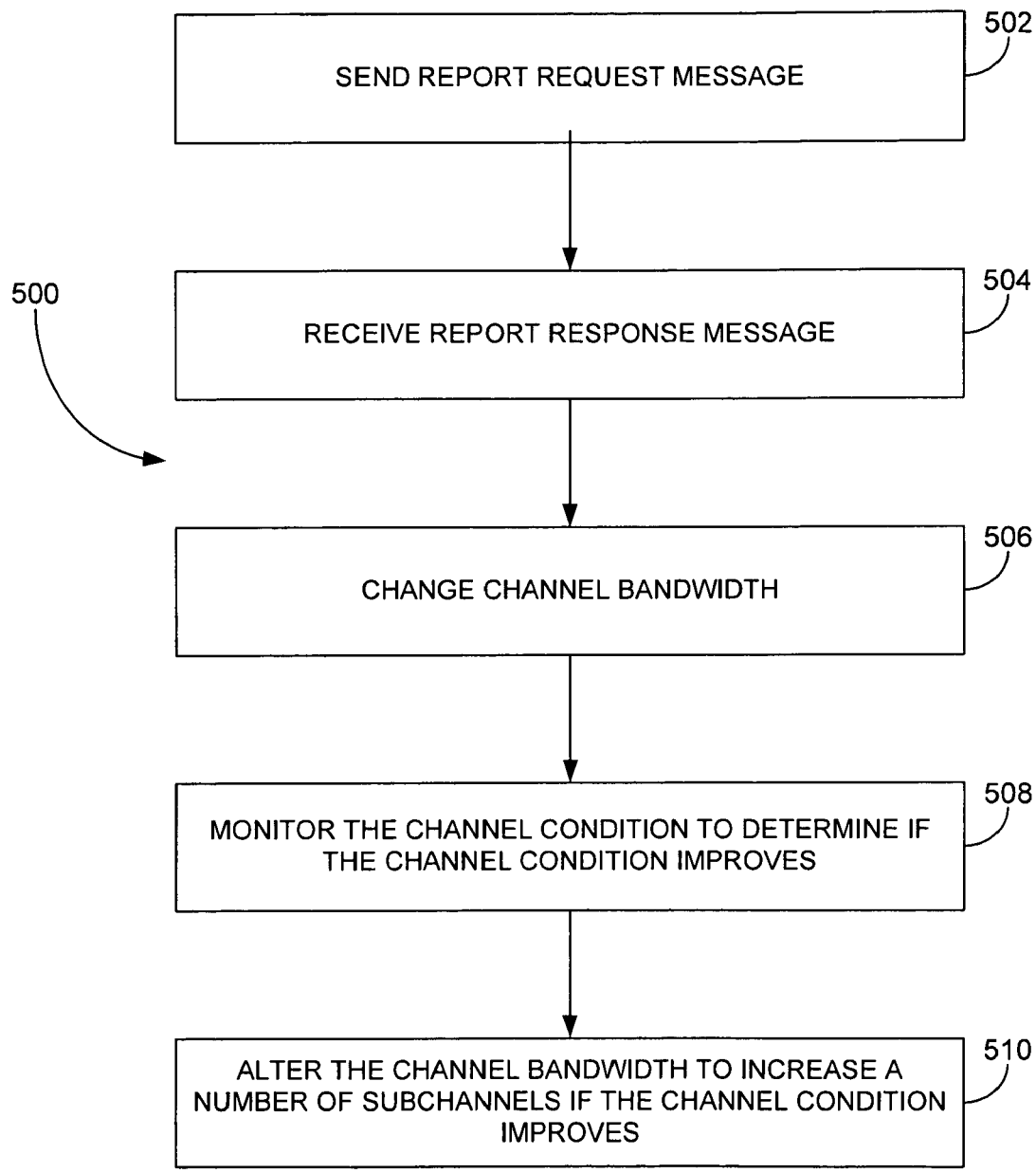
FIG. 5 illustrates another embodiment for altering the channel bandwidth in a wireless communication system.

FIG. 5 illustrates another embodiment 500 of a method for altering a channel bandwidth. Embodiment 500 including sending a report request message from an access node to a wireless device at step 502. Amongst other information such a report request message may comprise a request that the wireless device return to the access node an indicator of the ability of the wireless device to change the channel bandwidth from a first channel bandwidth to at least a second channel bandwidth depending upon the conditions of the channel.

Upon receiving the report request message, the wireless device will reply and a report response message will be transmitted from the wireless device and received at an access node at step 504. This report response message will include, amongst any other desired information, a channel condition for the wireless device.

Depending upon the indicated channel condition, the channel bandwidth will be changed from the first channel bandwidth to the second channel bandwidth based upon the channel condition at step 506. The channel condition indicator may comprise a carrier interference to noise ratio, for example. Alternatively, the channel condition indicator may comprise a received signal strength indicator. Yet still alternatively, both the carrier interference to noise ratio and the received signal strength indicator may be used to determine whether there is a change in channel condition for the wireless device.

At step 508 the method 500 contemplates periodic or continuous monitoring of channel conditions to determine if an improvement in channel conditions has occurred. If the monitoring of the channel conditions indicates that the channel condition has improved, then at step 510 the channel bandwidth can be adjusted by altering the channel bandwidth to increase the number of subchannels if the channel condition improves.

At step 510, if it has been determined that the channel bandwidth can be increased due to improved channel conditions, the alteration of the channel bandwidth can be accomplished by the access node sending a bandwidth alteration message to the wireless device to direct the wireless device to utilize the increased number of subchannels. After receipt of such a message from the network, the receiving wireless device will accordingly increase the number of subchannels utilized to receive the transmission.

Figure 6:
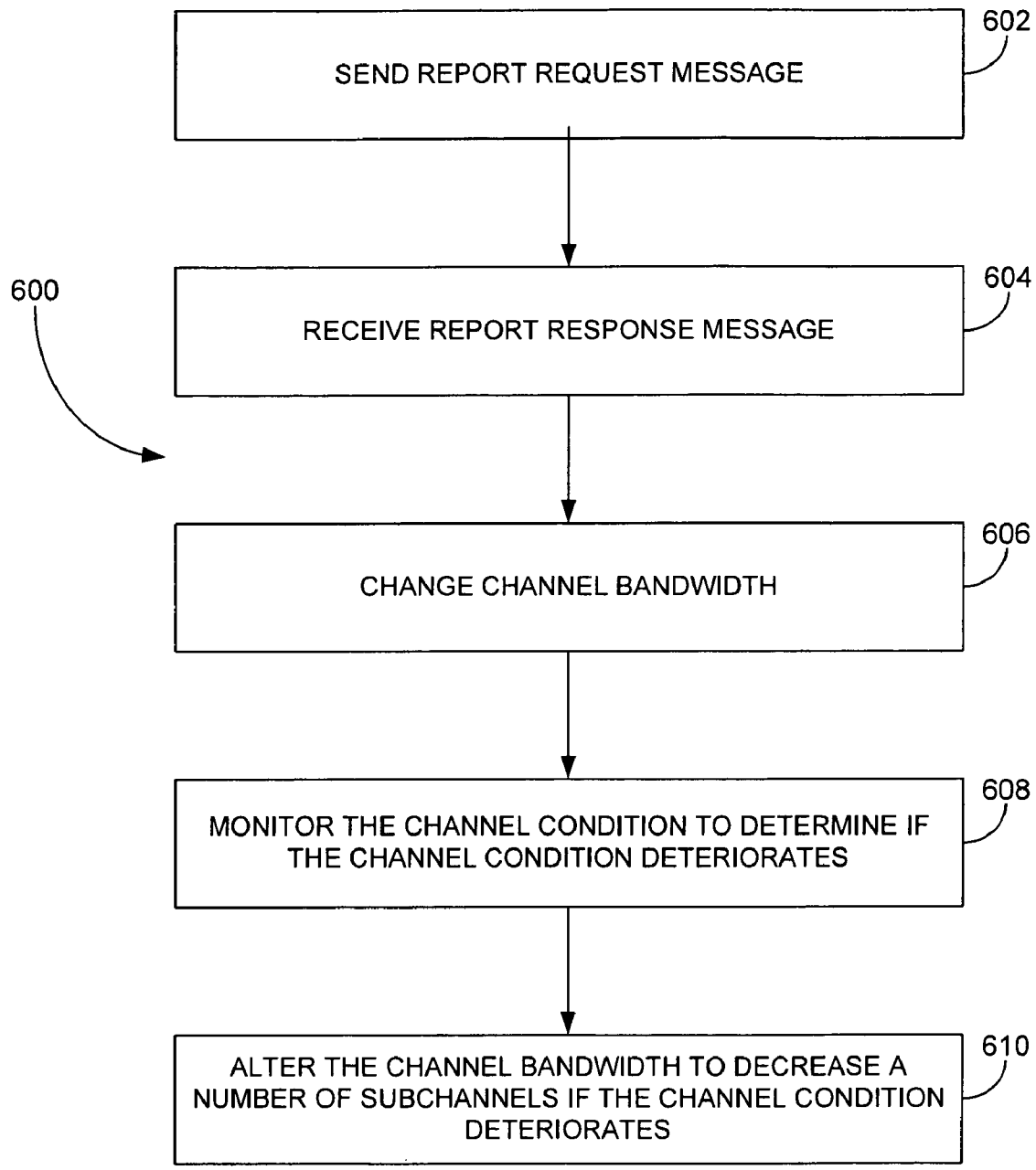
FIG. 6 illustrates another embodiment for altering the channel bandwidth in a wireless communication system.

Referring now to FIG. 6, another embodiment 600 of a method for altering the channel bandwidth in a wireless network is shown. Embodiment 600 includes sending a report request message from an access node to a wireless device at step 602. Amongst other information such a report request message may comprise a request that the wireless device return to the access node an indicator of the ability of the wireless device to change the channel bandwidth from a first channel bandwidth to at least a second channel bandwidth depending upon the conditions of the channel.

Upon receiving the report request message, the wireless device will reply and a report response message will be transmitted from the wireless device and received at an access node at step 604. This report response message will include, amongst any other desired information, a channel condition for the wireless device.

Depending upon the indicated channel condition, the channel bandwidth will be changed from the first channel bandwidth to the second channel bandwidth based upon the channel condition at step 606. The channel condition indicator may comprise a carrier interference to noise ratio, for example. Alternatively, the channel condition indicator may comprise a received signal strength indicator. Yet still alternatively, both the carrier interference to noise ratio and the received signal strength indicator may be used to determine whether there is a change in channel condition for the wireless device.

At step 608 the method 600 contemplates periodic or continuous monitoring of channel conditions to determine if a deterioration in channel conditions has occurred. If the monitoring of the channel conditions indicates that the channel condition has deteriorated, then at step 610 the channel bandwidth can be adjusted by altering the channel bandwidth to decrease the number of subchannels.

At step 610, if it has been determined that the channel bandwidth should be decreased due to a deterioration in channel conditions, the alteration of the channel bandwidth can be accomplished by the access node sending a bandwidth alteration message to the wireless device to direct the wireless device to utilize the decreased number of subchannels. After receipt of such a message from the network, the receiving wireless device will accordingly decrease the number of subchannels utilized to receive the transmission.

Figure 7:
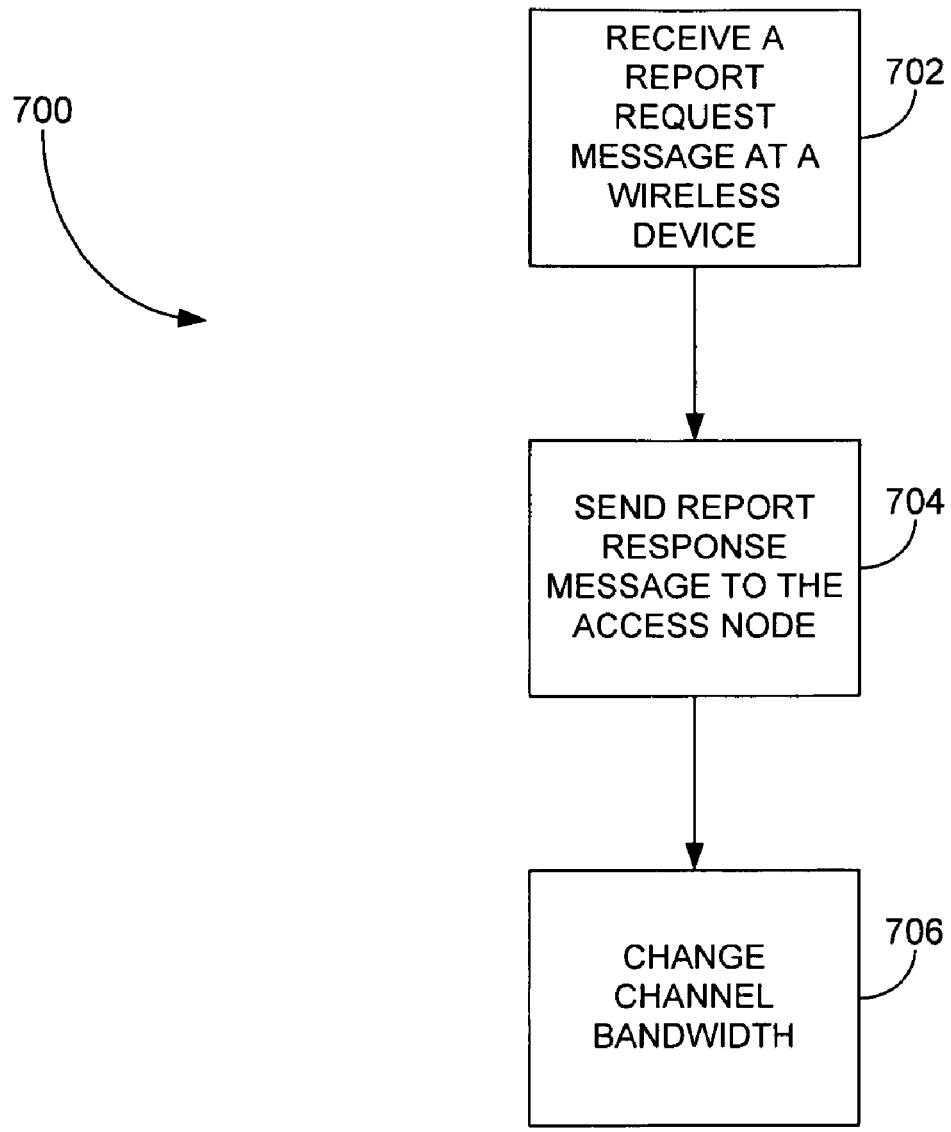
FIG. 7 illustrates another embodiment for altering the channel bandwidth in a wireless communication system.

FIG. 7 illustrates another embodiment 700 of a method for altering the channel bandwidth in a wireless system. Method 700 includes receiving at a wireless device a report request message from an access node at step 702. Such a report request message may include, among other requests for information, a request for an indicator of the ability of the wireless device to change the channel bandwidth from a first channel bandwidth to a second channel bandwidth.

In response to receiving the report request message, the wireless device will send a report response message to the access node at step 704. As with the previous embodiments, such a report response message may comprise a channel condition for the wireless device as well as an indicator of the ability of the wireless device to change the channel bandwidth from the first channel bandwidth to the second channel bandwidth. At step 706 the channel bandwidth is changed from the first channel bandwidth to the second channel bandwidth based upon the channel condition.

Figure 8:
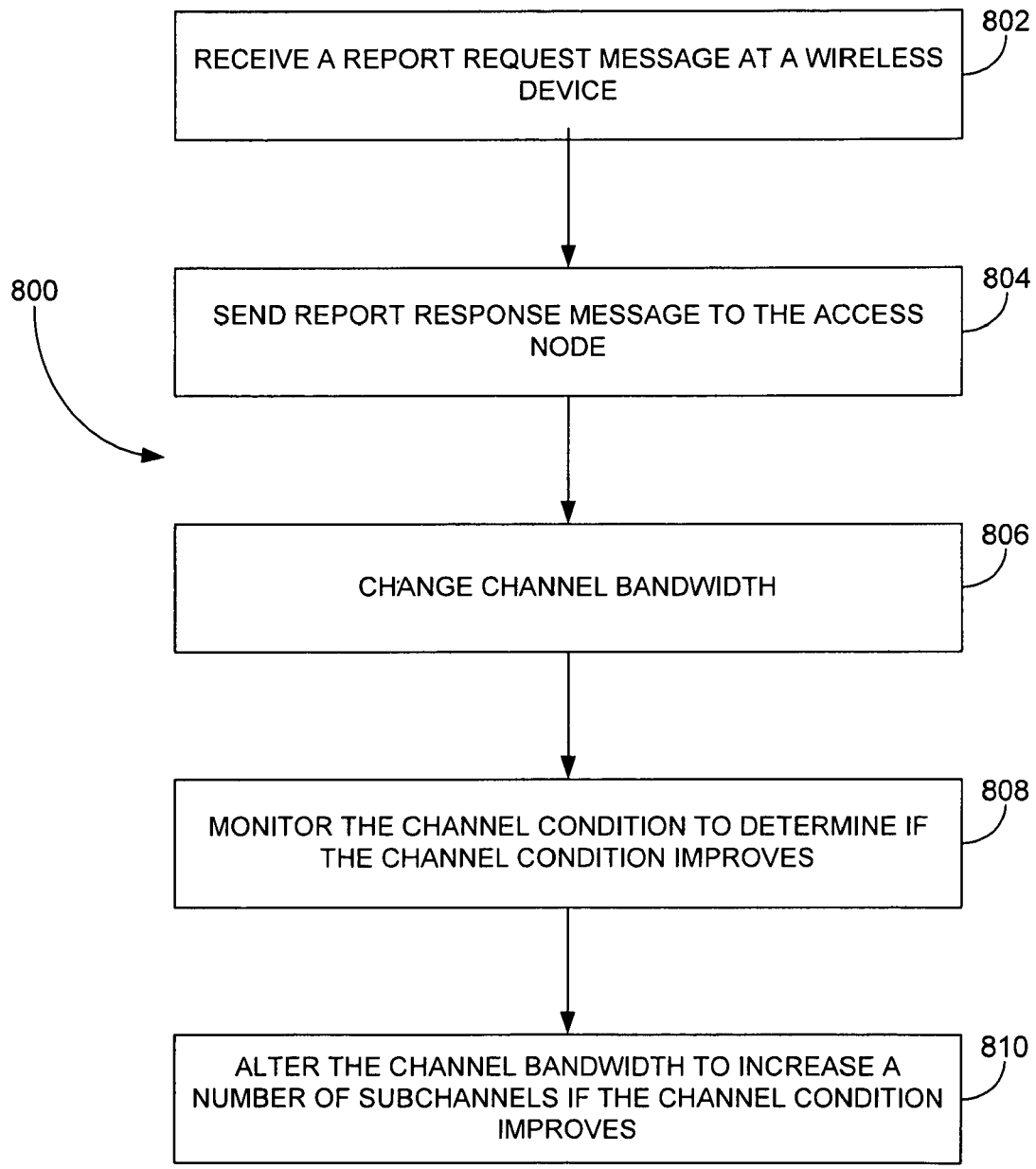
FIG. 8 illustrates another embodiment for altering the channel bandwidth in a wireless communication system.

FIG. 8 illustrates yet another embodiment of a method 800 for altering the channel bandwidth in a wireless system. Method 800 includes receiving at a wireless device a report request message from an access node at step 802. Such a report request message may include, among other requests for information, a request for an indicator of the ability of the wireless device to change the channel bandwidth from a first channel bandwidth to a second channel bandwidth.

In response to receiving the report request message, the wireless device will send a report response message to the access node at 804. As with the previous embodiments, such a report response message may comprise a channel condition for the wireless device as well as an indicator of the ability of the wireless device to change the channel bandwidth from a first channel bandwidth to a second channel bandwidth.

At step 806 the channel bandwidth is changed from the first channel bandwidth to the second channel bandwidth based upon the channel condition. Method 800 further comprises step 808, wherein the channel condition is monitored to determine if the channel condition improves. At step 810, the channel bandwidth is altered to increase the number of subchannels if the channel condition improves. As with the other embodiments, the channel condition can be determined by examining the carrier interference to noise ratio, the received signal strength indicator, or both.

At step 810, if it has been determined that the channel bandwidth should be increased due to an improvement in channel conditions, the alteration of the channel bandwidth can be accomplished by the access node sending a bandwidth alteration message to the wireless device to direct the wireless device to utilize the increased number of subchannels. After receipt of such a message from the network, the receiving wireless device will accordingly increase the number of subchannels utilized to receive the transmission.

Figure 9:
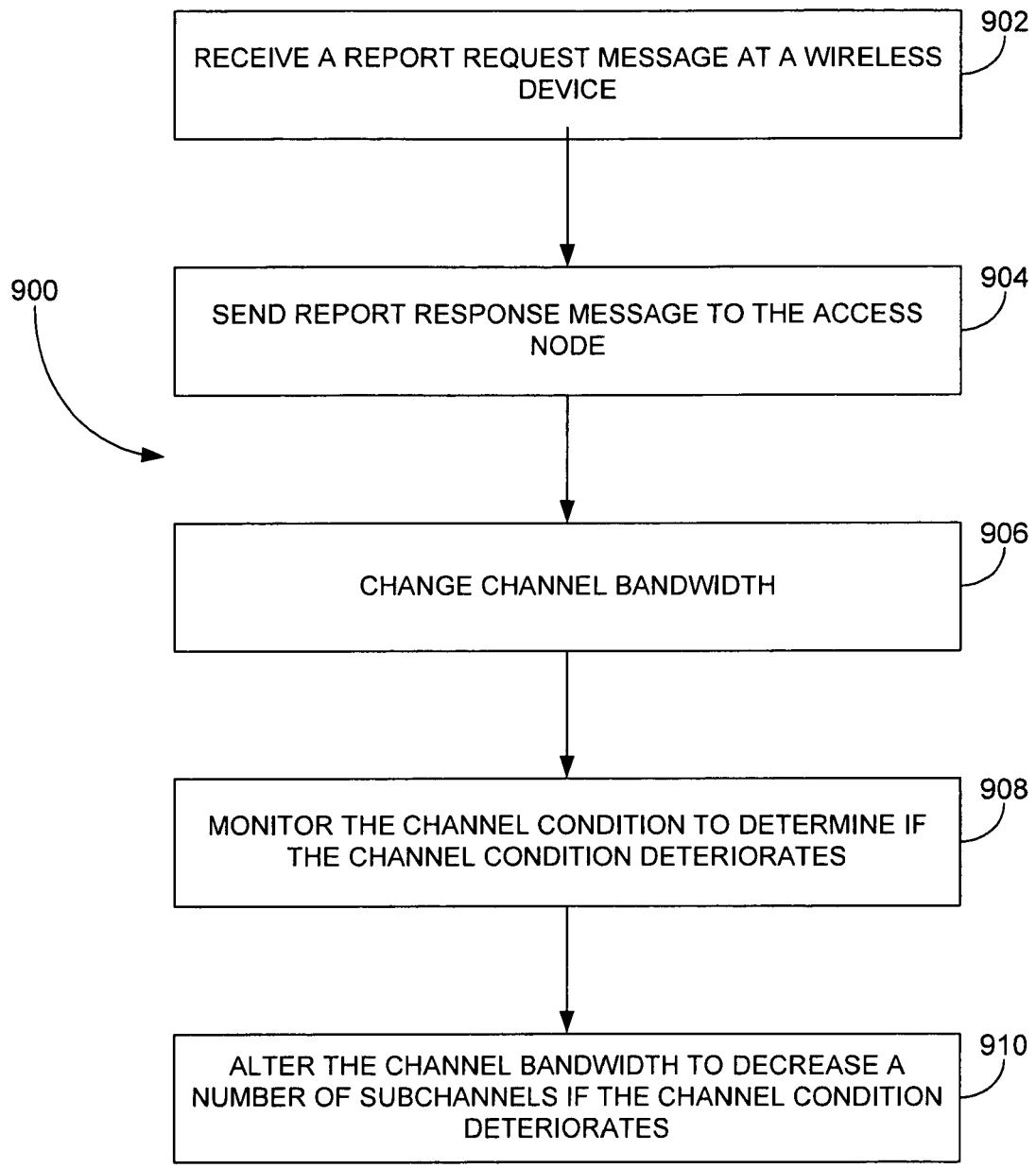
FIG. 9 illustrates another embodiment for altering the channel bandwidth in a wireless communication system.

FIG. 9 illustrates another embodiment of a method 900 for altering the bandwidth in a wireless network. Method 900 includes receiving at a wireless device a report request message from an access node at step 902. Such a report request message may include, among other requests for information, a request for an indicator of the ability of the wireless device to change the channel bandwidth from a first channel bandwidth to a second channel bandwidth.

In response to receiving the report request message, the wireless device will send a report response message to the access node at step 904. As with the previous embodiments, such a report response message may comprise a channel condition for the wireless device as well as an indicator of the ability of the wireless device to change the channel bandwidth from a first channel bandwidth to a second channel bandwidth.

At step 906 the channel bandwidth is changed from the first channel bandwidth to the second channel bandwidth based upon the channel condition. Method 900 further comprises step 908, wherein the channel condition is monitored to determine if the channel condition deteriorates. At step 910, the channel bandwidth is altered to decrease the number of subchannels if the channel condition deteriorates. As with the other embodiments, the channel condition can be determined by examining the carrier interference to noise ratio, the received signal strength indicator, or both.

At step 910, if it has been determined that the channel bandwidth should be decreased due to a deterioration in channel conditions, the alteration of the channel bandwidth can be accomplished by the access node sending a bandwidth alteration message to the wireless device to direct the wireless device to utilize the decreased number of subchannels. After receipt of such a message from the network, the receiving wireless device will accordingly decrease the number of subchannels utilized to receive the transmission.

It will be understood to those skilled in the art of wireless communications that the data can be organized in various manners for transmission. Consequently, the transmission of the report request message, the report response message, and the channel bandwidth alteration messages may be formatted in various manners and transmitted at various times.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for altering a channel bandwidth in a wireless system, the method comprising:
   sending a report request message to a wireless device, wherein the report request message comprises a request for an indicator of an ability of the wireless device to change the channel bandwidth from a first channel bandwidth to a second channel bandwidth;
   receiving a report response message from the wireless device at an access node, wherein the report response message comprises a channel condition for the wireless device;

changing the channel bandwidth from the first channel bandwidth to the second channel bandwidth based upon the channel condition;

monitoring the channel condition to determine if the channel condition deteriorates; and altering the channel bandwidth to decrease a number of subchannels if the channel condition deteriorates, wherein the channel condition is determined to have deteriorated when there is a deterioration in at least one of a carrier interference to noise ratio and a received signal strength indication, and wherein altering the channel bandwidth to decrease the number of subchannels if the channel condition deteriorates comprises sending a bandwidth alteration message to the wireless device to direct the wireless device to utilize the decreased number of subchannels.

2. The method of claim 1 wherein the channel condition comprises a carrier interference to noise ratio.

3. The method of claim 2 wherein the channel condition is determined to have improved when there is an improvement in the carrier interference to noise ratio.

4. The method of claim 1 wherein the channel bandwidth comprises one or more subcarriers.

5. The method of claim 1 further comprising monitoring the channel condition to determine if the channel bandwidth requires adjustment.

6. The method of claim 5 further comprising adjusting the channel bandwidth to a third channel bandwidth from the second channel bandwidth when the channel condition changes.

7. The method of claim 1 further comprising:

monitoring the channel condition to determine if the channel condition improves; and altering the channel bandwidth to increase a number of subchannels if the channel condition improves.

8. The method of claim 7 wherein the channel condition is determined to have improved when there is an improvement in a carrier interference to noise ratio.

9. The method of claim 7 wherein the channel condition is determined to have improved when there is an improvement in a received signal strength indication.

10. The method of claim 7 wherein altering the channel bandwidth to increase the number of subchannels if the channel condition improves comprises:

sending a bandwidth alteration message to the wireless device to direct the wireless device to utilize the increased number of subchannels.

11. A method for altering a channel bandwidth in a wireless system, the method comprising:

receiving at a wireless device a report request message from an access node, wherein the report request message requests an indicator of an ability of the wireless device to change the channel bandwidth from a first channel bandwidth to a second channel bandwidth;

sending a report response message from the wireless device to the access node, wherein the report response message comprises a channel condition for the wireless device and the indicator of the ability of the wireless device to change the channel bandwidth from the first channel bandwidth to the second channel bandwidth;

changing the channel bandwidth from the first channel bandwidth to the second channel bandwidth based upon the channel condition;

monitoring the channel condition to determine if the channel condition improves or deteriorates;

altering the channel bandwidth to increase a number of subchannels if the channel condition improves, and altering the channel bandwidth to decrease a number of subchannels if the channel condition deteriorates, wherein the channel condition is determined to have improved when there is an improvement in at least one of a carrier interference to noise ratio and a received signal strength indication, and wherein altering the channel bandwidth to increase the number of subchannels if the channel condition improves comprises receiving a bandwidth alteration message directing the wireless device to utilize the increased number of subchanne.

12. A method for altering a channel bandwidth in a wireless system, the method comprising:

receiving at a wireless device a report request message from an access node, wherein the report request message requests an indicator of an ability of the wireless device to change the channel bandwidth from a first channel bandwidth to a second channel bandwidth;

sending a report response message from the wireless device to the access node, wherein the report response message comprises a channel condition for the wireless device and the indicator of the ability of the wireless device to change the channel bandwidth from the first channel bandwidth to the second channel bandwidth;

changing the channel bandwidth from the first channel bandwidth to the second channel bandwidth based upon the channel condition;

monitoring the channel condition to determine if the channel condition deteriorates;

altering the channel bandwidth to decrease a number of subchannels if the channel condition deteriorates, wherein the channel condition is determined to have deteriorated when there is deterioration in at least one of a carrier interference to noise ratio and a received signal strength indication, and wherein altering the channel bandwidth to decrease the number of subchannels if the channel condition deteriorates comprises receiving a bandwidth alteration message directing the wireless device to utilize the decreased number of subchannels.

* * * * *